United States Patent [19]

Zee-Cheng et al.

[11] Patent Number: 4,782,092

[45] Date of Patent: Nov. 1, 1988

[54] 5,8-DICHLORO-4-HYDROXY-1-[(AMINOALKYL) AMINO]-9,10-ANTHRACENEDIONES, PHARMACEUTICAL COMPOSITIONS AND USE

[75] Inventors: Robert K. Zee-Cheng, Shawnee; Chia C. Cheng, Leawood, both of Kans.

[73] Assignee: Mid-America Cancer Center, Kansas City, Kans.

[21] Appl. No.: 882,198

[22] Filed: Jul. 3, 1986

Related U.S. Application Data

[63] Continuation of Ser. No. 585,432, Mar. 2, 1984, abandoned.

[51] Int. Cl.[4] .................. A61K 31/135; C07C 87/64
[52] U.S. Cl. .................. 514/649; 514/237.8; 514/325; 514/408; 514/428; 514/650; 544/156; 546/204; 548/528; 260/380
[58] Field of Search .................. 544/156; 546/204; 548/528; 260/380; 514/237, 325, 408, 428, 650, 649

[56] References Cited

U.S. PATENT DOCUMENTS

| | | |
|---|---|---|
| 3,123,605 | 3/1964 | Turetzky .................. 260/380 |
| 3,354,182 | 11/1967 | Kuhne .................. 544/156 |
| 3,442,895 | 5/1969 | Bugaut .................. 544/156 |
| 3,467,483 | 9/1969 | Bugaut .................. 544/156 |
| 4,310,666 | 1/1982 | Zee-Cheng .................. 260/380 |

Primary Examiner—Robert W. Ramsuer
Attorney, Agent, or Firm—Krass and Young

[57] ABSTRACT

Chemical compounds are provided that are novel 5,8-dichloro-4-hydroxy-1-[(aminoalkyl)amino]-9,10-anthracenediones (I), as well as a method for their production, pharmaceutical compositions comprising the compounds, and methods of treatment using the compounds in dosage form. Compounds of the invention have pharmacological properties and are useful antimicrobial agents and antitumor agents.

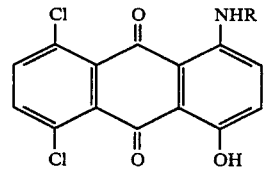

4 Claims, No Drawings

5,8-DICHLORO-4-HYDROXY-1-[(AMINOALKYL)AMINO]-9,10-ANTHRACENEDIONES, PHARMACEUTICAL COMPOSITIONS AND USE

RELATED APPLICATION

This application is a continuation of copending application Ser. No. 585,432, filed Mar. 2, 1984 now abandoned.

TECHNICAL FIELD

The invention relates to novel 5,8-dichloro-4-hydroxy-1-[(aminoalkyl)amino]-9,10-anthracenediones, to methods for their production, to pharmaceutical compositions comprising the compounds, and to methods of treatment using the compounds in dosage form. The compounds of the invention have pharmacological properties and are useful antimicrobial agents and antitumor agents.

BACKGROUND OF THE INVENTION

4-Hydroxy-1-[(aminoalkyl)amino]-9,10-anthracenediones are known as described in the literature, for example, the article entitled "Structural Modification Study of Bis(substituted aminoalkylamino)anthraquinones" by Robert K.-Y. Zee-Cheng, Eugene G. Podrebarac, C. S. Menon, and C. C. Cheng, J. Med. Chem., 22, 501(1979); and European Pat. Appln. No. 80301790.4, published Jan. 7, 1981, as No. 0021622. No halogenated derivatives have been reported.

SUMMARY OF THE INVENTION

The invention in one aspect relates to 5,8-dichloro-4-hydroxy-1-[(aminoalkyl)amino]-9,10-anthracenedione compounds having in free base form the structural formula I:

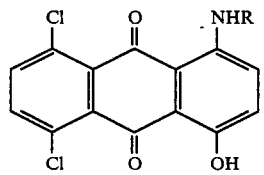

and the pharmaceutically acceptable salts thereof, where R is alkylene-$NR_xR_y$ where alkylene is a 2 to 4 carbon straight or branched hydrocarbon chain which may be substituted by hydroxyl, and $R_x$ and $R_y$ are each independently H, 1 to 4 carbon straight or branched chain alkyl, or 2 to 4 carbon straight or branched chain hydroxyalkyl, or combined with said nitrogen represent substituted or unsubstituted piperidyl, morpholyl, or pyrrolidyl.

The compounds of the invention form pharmaceutically acceptable salts with both organic and inorganic acids. Examples of suitable acids for salt formation are hydrochloric, sulfuric, phosphoric, acetic, citric, oxalic, malonic, salicylic, malic, fumaric, succinic, ascorbic, maleic, methanesulfonic, isethionic, lactic, gluconic, glucuronic, sulfamic, benzoic, tartaric, pamoic, and the like. The salts are prepared by contacting the free base form with an equivalent amount of the desired acid in the conventional manner. The free base forms may be regenerated by treating the salt form with a base. For example, dilute aqueous base solutions may be utilized. Dilute aqueous sodium hydroxide, potassium carbonate, ammonia, and sodium bicarbonate solutions are suitable for this purpose. The free base forms differ from their respective salt forms somewhat in certain physical properties such as solubility in polar solvents, but the salts are otherwise equivalent to their respective free base forms for purposes of the invention.

The compounds of the invention can exist in unsolvated as well as solvated forms, including hydrated forms. In general, the solvated forms with pharmaceutically acceptable solvents such as water, ethanol and the like are equivalent to the unsolvated forms for purposes of the invention.

The invention in another aspect relates to preferred compounds having the structural formula I, and the pharmaceutically acceptable salts thereof. These compounds in free base form, have the following names:

5,8-dichloro-4-hydroxy-1-[2-(dimethylamino)ethyl]amino-9,10-anthracenedione, 5,8-dichloro-4-hydroxy-1-[[2-[2-hydroxyethyl)aminoethyl]amino]]-9,10-anthracenedione, 5,8-dichloro-4-hydroxy-1-[2-(pyrrolidinyl)ethyl]amino-9,10-anthracenedione, 5,8-dichloro-4-hydroxy-1-[2-(diethylamino)ethyl]amino-9,10-anthracenedione, 5,8-dichloro-4-hydroxy-1-[2-(morpholino)ethyl]amino-9,10-anthracenedione, 5,8-dichloro-4-hydroxy-1-[2-(piperidinyl)ethyl]amino-9,10-anthracenedione, 5,8-dichloro-4-hydroxy-1-[2-(dimethylamino)propyl-[amino-9,10-anthracenedione, 5,8-dichloro-4-hydroxy-1-[4-(dimethylamino)butyl-]amino-9,10-anthracenedione, 5,8-dichloro-4-hydroxy-1-[3-(pyrrolidinyl)propyl-]amino-9,10-anthracenedione, 5,8-dichloro-4-hydroxy-1-[2-(methylamino)ethyl-]amino-9,10-anthracenedione, 5,8-dichloro-4-hydroxy-1-[2-(amino)ethyl]amino-9,10-anthracenedione, 5,8-dichloro-4-hydroxy-1-[2-(n-butylamino)ethyl]amino 9,10-anthracenedione, and 5,8-dichloro-4-hydroxy-1-[3-(amino)propyl]amino-9,10-anthracenedione.

Of these compounds, 5,8-dichloro-4-hydroxy-1-[[2-[(2-hydroxyethyl)aminoethyl]amino]]-9,10-anthracenedione and 5,8-dichloro-4-hydroxy-1-[2-(dimethylamino)ethyl-]amino-9,10-anthracenedione are preferred for their pharmacological properties.

PROCESS FOR PREPARING THE COMPOUNDS

The invention in one process aspect comprises a process for preparing compounds having the structural formula I:

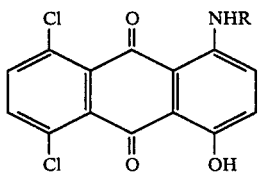

which comprises reacting 1,4-dichloroquinizarin and an alkylenediamine having the structural formula $H_2N$-R under dehydration conditions and isolating the product in free base form or pharmaceutically acceptable salt form, where R has the above meaning. The reaction conditions are subject to considerable variation. The reaction is conveniently carried out in a compatible solvent such as butanol, at room temperature for a short period followed by reacting at reflux temperature for removal of water. The product is preferably isolated in acid addition salt form obtained by treating the free base in solution with a selected acid in solution such as methanolic HCl. The starting materials are known compounds.

Purification of compounds or products obtained by the method of the invention is accomplished in any suitable way, preferably by column chromatography or crystallization.

The invention in its composition aspect relates to a pharmaceutical composition for treating microbial infection comprising a compound having structural formula I and the pharmaceutically acceptable salts thereof in combination with a pharmaceutically acceptable carrier.

The invention in another aspect relates to a pharmaceutical composition for treating leukemia comprising a compound having structural formula I and the pharmaceutically acceptable salts thereof in combination with a pharmaceutically acceptable carrier.

The invention in another aspect relates to a pharmaceutical composition for treating solid tumors comprising a compound having the structural formula I and the pharmaceutically acceptable salts thereof in combination with a pharmaceutically acceptable carrier.

The invention in another method aspect relates to a method for treating microbial infections in a mammal which comprises administering a sufficient amount of a compound having the structural formula I and the pharmaceutically acceptable salts thereof in combination with a pharmaceutically acceptable carrier, to a mammal in need thereof.

The invention in another method aspect relates to a method for treating leukemia in a mammal which comprises administering a sufficient amount of compound having the structural formula I and the pharmaceutically acceptable salts thereof in combination with a pharmaceutically acceptable carrier, to a mammal in need thereof.

The invention in another method aspect relates to a method for treating solid tumors in a mammal which comprises administering a sufficient amount of a compound having the structural formula I and the pharmaceutically acceptable salts thereof in combination with a pharmaceutically acceptable carrier, to a mammal in need thereof.

PHYSICAL AND PHARMACOLOGICAL PROPERTIES OF THE COMPOUNDS

The compounds of the invention are new chemical substances of value as pharmacological agents for the treatment of bacterial and fungal infections in warm-blooded animals. They may also be utilized as antiseptic agents such as for use in the sterilization of laboratory glassware etc.

The activity of representative compounds of the invention was established by test protocols described below.

TEST PROTOCOLS

1. In vitro

One test protocol is the in vitro antibacterial/antifungal (ABF) test. Compounds are tested for antimicrobial activity in an agar-disk diffusion assay, a standard microbiological technique for testing antibiotics. After incubation of each culture with a test compound, a zone of inhibition is determined. The zone diameter (mm) of active compounds ranges from a minimum of 14 mm to as high as 18 mm, with a greater diameter reflecting higher activity. For convenience, values are reported for three gram-negative bacterial species, *Alcaligenes viscolactis* ATCC 21698, *Escherichia coli* Tol and PD04863, *Branhamella catarrhalis* PD03596; and one gram-positive bacterium, *Bacillus subtilis* PD04555.

In another test protocol, growth-inhibitory effects are measured against the mouse tumor line L1210 in suspension cell culture. Cell cultures were initiated at a density of 50,000 cells/ml in medium RPMI 1630 supplemented with 10 percent fetal calf serum. Composition of this culture medium and details of the culture procedure follow the published method (Journal of the National Cancer Institute 36, 405–415, 1966). Cultures are maintained at 37 degrees in stationary suspension culture under a 95 percent air +5 percent $CO_2$ atmosphere. Test compounds are added to treated cultures at the time of initiation, and are present continually. After 72 hours, 40-fold dilutions of drug-treated and untreated control cultures are prepared in 0.9 percent NaCl solution, and cells are counted on an electronic particle counter. The growth-inhibitory effects are expressed as $ID_{50}$ values, namely test compound inhibitory dosages or concentrations required to decrease cell count in treated cultures to 50 percent of the cell count of untreated control cultures.

2. In Vivo

Another test protocol is the in vivo lymphocytic leukemia P388 test. The animals used are either male or female $CD_2F_1$ mice, six or seven animals per test group. The tumor transplant is by intraperitoneal injection of dilute ascitic fluid containing cells of lymphocytic leukemia P388. The test compounds are administered intraperitoneally once daily for five consecutive days at various doses following tumor inoculation. The animals are weighed and survivors are recorded on a regular basis for 30 days. A compound is designated "toxic" if, at a given dose, all animals died prior to four days after the first injection of drug. A ratio of survival time for treated (T)/control (C) animals is calculated. A criterion for efficacy is a ratio T/C times 100 greater than or equal to 125. See *Cancer Chemotherapy Reports*, Part 3, 3, 1 (1972) for a comprehensive discussion of the protocol.

Another test protocol utilizes the solid tumor B16 melanoma in mice. The tumor is inoculated by intraperitoneal injection. The test compounds are administered intraperitoneally once daily for nine consecutive days at various doses following tumor inoculation. A ratio of survival time for treated (T)/control (C) animals is calculated. A criterion for efficacy is a ratio T/C times 100 greater than or equal to 15. See *Cancer Therapy Reviews*, 7,167(1980) and references cited therein for further details and interpretation of the test.

These test protocol procedures gave results listed in Tables 1 through 4 for representative compounds of the invention.

TABLE 1

| Antimicrobial activity of 5,8-Dichloro-4-hydroxy-1-[[2-[(2-hydroxyethyl)aminoethyl]amino]]-9,10-anthracenedione | |
|---|---|
| Microorganism | Inhibition Zone Diameter mm (concentration mg/ml) |
| *Alcaligenes viscolactis* (ATCC-21698) | 15 (5.0); 14 (1.0) |
| *Escherichia coli* Tol | 18 (5.0); 15 (1.0) |
| *Escherichia coli* PD08463 | 14 (5.0) |

TABLE 1-continued

Antimicrobial activity of 5,8-Dichloro-4-hydroxy-1-[[2-[(2-hydroxyethyl)aminoethyl]amino]]-9,10-anthracenedione

| Microorganism | Inhibition Zone Diameter mm (concentration mg/ml) |
|---|---|
| Branhamella catarrhalis PD03596 | 14 (5.0) |
| Bacillus subtilis PD04555 | 16 (5.0); 14 (1.0) |

TABLE 2

Antileukemic Activity of 5,6-Dichloro-4-hydroxy-1-[(2-[(2-hydroxyethyl)aminoethyl]amino]-9,10-anthracenedione Against L1210 Leukemia
Molar Concentration Required for 50% Inhibition of Growth

| Test 1 | Test 2 |
|---|---|
| $8.66 \times 10^{-8}$ | $1.11 \times 10^{-7}$ |

TABLE 3

Antileukemic Activity of 5,6-Dichloro-4-hydroxy-1-[2-(dimethylamino)ethyl]amino-9,10-anthracenedione Against L1210 Leukemia
Molar Concentration Required for 50% Inhibition of Growth

| Test 1 | Test 2 |
|---|---|
| $9.19 \times 10^{-8}$ | $8.09 \times 10^{-8}$ |

TABLE 4

Antitumor Activity* of 5,8-Dichloro-4-hydroxy-1-[[2-[(2-hydroxyethyl)aminoethyl]amino]-7,10-anthracenedione In Mice

| Tumor | Route Tumor/Drug | Regimen | Dose/mg/kg | T/C × 100 (Percent) |
|---|---|---|---|---|
| P388 Leukemia | IP/IP | QOID × 5 | 100 | 235 |
| | | | 100 | 202 |
| | | | 50 | 175 |
| | | | 50 | 188 |
| | | | 50 | 177 |
| | | | 25 | 242(cures) |
| | | | 25 | 163 |
| | | | 12.5 | 146 |
| | | | 6.25 | 154 |
| B16 Melanoma (B6C3F1) | IP/IP | QOID × 9 | 400 | 190 |
| | | | 200 | 180 |
| | | | 200 | 172 |
| | | | 160 | 326 |
| | | | 100 | 270(cures) |
| | | | 100 | 191 |
| | | | 80 | 271(cures) |
| | | | 50 | 252(cures) |
| | | | 50 | 143 |
| | | | 40 | 231(cures) |
| | | | 25 | 199(cures) |
| | | | 25 | 130 |
| | | | 20 | 224 |
| | | | 12.5 | 172(cures) |
| | | | 6.25 | 166 |

*Procedure described in Cancer Chemotherapy Reviews, 7, 167 (1980) and references cited therein.

PREPARATION OF PHARMACEUTICAL COMPOSITIONS

When being utilized as pharmacological agents, the compounds of the invention can be prepared and administered in a wide variety of topical, oral, and parenteral dosage forms. It will be clear to those skilled in the art that the following dosage forms may comprise as the active component, one or more compounds of formula I, a corresponding pharmaceutically acceptable salt of any of said compounds, or a mixture of such compounds and/or salts.

For preparing pharmaceutical compositions from the compounds described by this invention, inert, pharmaceutically acceptable carriers can be either solid or liquid. Solid form preparations include powders, tablets, dispersible granules, capsules, cachets, and suppositories. A solid carrier can be one or more substances which may also act as diluents, flavoring agents, solubilizers, lubricants, suspending agents, binders, or tablet disintegrating agents; it can also be an encapsulating material. In powders, the carrier is a finely divided solid which is in admixture with the finely divided active compound. In the tablet the active compound is mixed with carrier having the necessary binding properties in suitable proportions and compacted in the shape and size desired. The powders and tablets preferably contain from 5 or 10 to about 70 percent of the active ingredient. Suitable solid carriers are magnesium carbonate, magnesium stearate, talc, sugar, lactose, pectin, dextrin, starch, gelatin, tragacanth, methyl cellulose, sodium carboxymethyl cellulose, a low melting wax, cocoa butter, and the like. The term "preparation" is intended to include the formulation of the active compound with encapsulating material as carrier providing a capsule in which the active component (with or without other carriers) is surrounded by carrier, which is thus in association with it. Similarly, cachets are included. Tablets, powders, cachets, and capsules can be used as solid dosage forms suitable for oral administration.

Liquid form preparations include solutions, suspensions, and emulsions. As an example may be mentioned water or water-propylene glycol solutions for parenteral injection. Liquid preparations can also be formulated in solution in aqueous polyethylene glycol solution. Aqueous solutions suitable for oral use can be prepared by dissolving the active component in water and adding suitable colorants, flavors, stabilizing, and thickening agents as desired. Aqueous suspensions suitable for oral use can be made by dispersing the finely divided active component in water with viscous material, i.e., natural or synthetic gums, resins, methyl cellulose, sodium carboxymethyl cellulose, and other well-known suspending agents.

Topical preparations include dusting powders, creams. lotions, gels, and sprays. These various topical preparations may be formulated by well-known procedures. See for example Remington's Pharmaceutical Sciences, Chapter 43, 14th Ed., Mack Publishing Co., Easton, Pennsylvania 18042, USA.

Preferably, the pharmaceutical preparation is in unit dosage form. In such form, the preparation is subdivided into unit doses containing appropriate quantities of the active component. The unit dosage form can be a packaged preparation, the package containing discrete quantities of preparation, for example, packeted tablets, capsules, and powders in vials or ampoules. The unit dosage form can also be a capsule, cachet, or tablet itself or it can be the appropriate number of any of these packaged forms.

The quantity of active compound in a unit dose of preparation may be varied or adjusted from 5 mg to 500 mg according to the particular application and the potency of the active ingredient.

In therapeutic use as pharmacological agents the compounds utilized in the pharmaceutical method of this invention are administered at the initial dosage of about 0.1 mg to about 10 mg per kilogram. A dose range of about 1 mg to about 5 mg per kilogram is preferred. The dosages, however, may be varied depending upon the requirements of the patient, the severity of the condition being treated, and the compound being employed. Determination of the proper dosage for a particular situation is within the skill of the art. Generally, treatment is initiated with smaller dosages which are less than the optimum dose of the compound. Thereafter, the dosage is increased by small increments until the optimum effect under the circumstances is reached. For convenience, the total daily dosage may be divided and administered in portions during the day if desired.

The active compounds may also be administered parenterally or intraperitoneally. Solutions of the active compound as a free base or pharmaceutically acceptable salt can be prepared in water suitably mixed with a surfactant such as hydroxypropylcellulose. Dispersions can also be prepared in glycerol, liquid polyethylene glycols, and mixtures thereof and in oils. Under ordinary conditions of storage and use, these preparations contain preservative to prevent the growth of microorganisms.

The pharmaceutical forms suitable for injectable use include sterile aqueous solutions or dispersions and sterile powders for the extemporaneous preparation of sterile injectable solutions or dispersions. In all cases the form must be sterile and must be fluid to the extent that easy syringability exists. It must be stable under the conditions of manufacture and storage and must be preserved against the contaminating action of microorganisms such as bacteria and fungi. The carrier can be a solvent or dispersion medium containing, for example, water, ethanol, polyol (for example, glycerol, propylene glycol, and liquid polyethylene glycol, and the like), N,N-dimethylacetamide, suitable mixtures thereof and vegetable oils. The proper fluidity can be maintained, for example, by the use of a coating such as lecithin, by the maintenance of the required particle size in the case of dispersion and by the use of surfactants. The prevention of the action of microorganisms can be brought about by various antibacterial and antifungal agents, for example, parabens, chlorobutanol, phenol, sorbic acid, thimerosal, and the like. In many cases, it will be preferable to include isotonic agents, for example, sugars or sodium chloride. Prolonged absorption of the injectable compositions can be brought about by the use in the compositions of agents delaying absorption, for example, aluminum monostearate and gelatin.

Sterile injectable solutions are prepared by incorporating the active compound in the required amount in the appropriate solvent with various of the other ingredients enumerated above, as required, followed by sterilization accomplished by filtering. Generally, dispersions are prepared by incorporating the various sterilized active ingredient into a sterile vehicle which contains the basic dispersion medium and the required other ingredients from those enumerated above. In the case of the sterile powders for the preparation of sterile injectable solutions, the preferred methods of preparation are vacuum drying and the freeze-drying technique which yield a powder of the active ingredient plus any additional desired ingredient from a previously sterile-filtered solution thereof.

As used herein, "pharmaceutically acceptable carrier" includes any and all solvents, dispersion media, coatings, antibacterial and antifungal agents, isotonic and absorption delaying agents and the like. The use of such media and agents for pharmaceutically active substances is well-known in the art. Except insofar as any conventional media or agent is incompatible with the active ingredient, its use in the therapeutic compositions is contemplated. Supplementary active ingredients can also be incorporated into the compositions.

It is especially advantageous to formulate parenteral compositions in unit dosage form for ease of administration and uniformity of dosage. Unit dosage forms used herein refers to physically discrete units suitable as unitary dosages for the mammalian subjects to be treated; each unit containing a predetermined quantity of active material calculated to produce the desired therapeutic effect in association with the required pharmaceutical carrier. The specification for the novel unit dosage forms of the invention are dictated by and directly dependent on (a) the unique characteristics of the active material and the particular therapeutic effect to be achieved, and (b) the limitation inherent in the art of compounding such an active material for the treatment of disease in living subjects having a diseased condition in which bodily health is impaired as herein disclosed in detail.

The principal active ingredient is compounded for convenient and effective administration in effective amounts with a suitable pharmaceutically-acceptable carrier in unit dosage forms as hereinbefore disclosed. A unit dosage form can, for example, contain the principal active compound in amounts ranging from about 1 to about 500 mg, with from about 5 to about 250 mg being preferred. Expressed in proportions, the active compound is generally present in from about 0.1 to about 500 mg/ml of carrier. In the case of compositions containing supplementary active ingredients, the dosages are determined by reference to the usual dose and the manner of administration of the said ingredients. The daily parenteral doses for mammalian subjects to be treated ranges from 0.1 mg/kg to 10 mg/kg. The preferred daily dosage range is 1 mg/kg to 5 mg/kg.

The invention is illustrated, and the best mode of practicing the same is described, by the following examples of preferred embodiments of selected compounds and their preparation and use.

EXAMPLE 1

Preparation of 5,8-dichloro-4-hydroxy-1-[[2-[(2-hydroxyethyl)aminoethyl]amino]]-9,10-anthracenedione To a mixture of 3.1 g (0.01 mole) of 1,4-dichloroquinizarin (I) in 60 ml of butanol was added, with stirring, a solution of 1.5 g (0.015 mole) of 2-[2-aminoethyl)amino]ethanol (II) in 20 ml of butanol. The mixture was refluxed for 5 hours with continuous stirring. It was cooled and the resulting dark purple crystals were collected by filtration. The solid was washed with petroleum ether (3×20 ml) and dried to give 4.0 g of the title product, m.p. 80°–100°. Recrystallization from a mixture of 500 ml of ethanol and 500 ml of petroleum ether (b.p. 60°–68°) gave 750 mg of the title product, m.p. 178°–180°. $\lambda$ max (MeOH) 206 nm (log $\epsilon$ 4.27), 239 (4.42), 258 (4.31), 540 (3.91) and 570 (3.97). Rf: 0.10 (in 5% MeOH and 95% CHCl$_3$).

Anal. Calcd for $C_{18}H_{16}Cl_2N_2O_4 \cdot \frac{1}{2}H_2O$: C, 53.47, H, 4.24; N, 6.93. Found: C, 53.40; H, 4.36; N, 7.22. Mass spec 395 (M$^+$-$\frac{1}{2}$H$_2$O), 397 (isotope Cl).

EXAMPLE 2

Preparation of 5,8-dichloro-4-hydroxy-1-[2-(dimethylamino)ethyl]amino-9,10-anthracenedione To a stirred mixture of 9.3 g (0.03 mole) of 1,4-dichloroquinizarin in 160 ml of butanol was added a solution of 4.4 ml (d=0.803, 0.04 mole) of 2-(dimethlamino)ethylamine in 40 ml of butanol. The mixture was heated at 135° for 5 hours, then cooled. The resulting dark purple solid was collected by filtration, washed with petroleum ether (3×20 ml), and dried to give 6 g of the title product, m.p. 125°–130°.

Two grams of the product was purified by eluting through a silica gel column using 1500 ml of chloroform as the eluting solvent. The resulting evaporated solid was recrystallized from a small amount of ethanol to give 0.3 g of the title product, m.p. 146°–148°. λmax (MeOH) 215 nm (log ε4.31), 238 (4.33), 290 (4.13), 345 (3.65), 540 (3.91) and 570 (3.85). Rf: 0.10 (in 5% MeOH and 95% $CHCl_3$).

Anal. Calcd for $C_{18}H_{16}Cl_2N_2O_3 \cdot \frac{1}{2}H_2O$: C, 55.68; H, 4.41; N, 7.22. Found: C, 55.50; H, 4.00; N, 6.99.

The hydrochloride acid addition salt is obtained by treating an ethereal solution of the free base with a slight excess of methanolic HCl, with stirring. The resulting hydrochloride salt product that forms as a precipitate is collected by filtration, washed with ether and dried.

Using the following alkylene diamine starting materials, the following compounds are prepared by the above exemplified procedures:

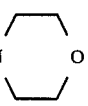

| Starting Material | 5,8-Dichloro-4-Hydroxy-9,10-Anthracenedione Product, as Free Base |
| --- | --- |
| $H_2N-CH_2CH_2N(CH_2)_4$ | 1-[2-(pyrrolidinyl)ethyl]amino- |
| $H_2N-CH_2CH_2N(C_2H_5)_2$ | 1-[2-(diethylamino)ethyl]amino- |
| $H_2N-CH_2CH_2N\langle O \rangle$ | 1-[2-(morpholino)ethyl]amino- |
| $H_2N-CH_2CH_2N(CH_2)_5$ | 1-[2-(piperidinyl)ethyl]amino- |
| $H_2N-CH_2CH_3N(CH_3)_2$ | 1-[2-(dimethylamino)propyl]amino- |
| $H_2N-CH_2CH_2CH_2CH_2N(CH_3)_2$ | 1-[4-(dimethylamino)butyl]amino- |
| $H_2N-CH_2CH_2CH_2N(CH_2)_4$ | 1-[3-(pyrrolidinyl)propyl]amino- |
| $H_2N-CH_2CH_2NH_2$ | 1-[2-(amino)ethyl]amino- |
| $H_2N-CH_2CH_2NHCH_3$ | 1-[2-(methylamino)ethyl]amino- |
| $H_2N-CH_2CH_2NHC_2H_5$ | 1-[2-(ethylamino)ethyl]amino- |
| $H_2N-CH_2CH_2NH-\underline{n}-C_4H_9$ | 1-[2-(n-butylamino)ethyl]amino- |
| $H_2N-CH_2CH_2CH_2NH_2$ | 1-[3-(amino)propyl]amino- |

EXAMPLE 3

PREPARATION OF INTRAVENOUS FORMULATIONS

A solution of 12.5 g of 5,8-dichloro-4-hydroxy-1-[2-(dimethylamino)ethyl]amino-9,10-anthracenedione (from Example 2) as the hydrochloride salt is prepared in 1 liter of water for injection at room temperature with stirring. The solution is sterile filtered into 500 5-ml vials, each of which contains 2 ml of solution containing 25 mg of compound, and sealed under nitrogen.

Alternatively, after sterile filtration into vials, the water may be removed by lyophilization, and the vials then sealed aseptically, to provide a powder which is redissolved prior to injection.

Having thus described our invention, what we claim and desire by Letters Patent to secure are the following:

1. 5,8-Dichloro-4-hydroxy-1-[(aminoalkyl)]-9,10-anthracenedione compounds having in free base form the structural formula I:

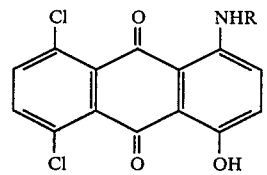

and the pharmaceutically acceptable salts thereof, where R is alkylene $-NR_xR_y$ where alkylene is a 2 to 4 carbon straight or branched hydrocarbon chain which may be substituted by hydroxyl, and $R_x$ and $R_y$ are each independently H, 1 to 4 carbon straight or branched chain alkyl, or 2 to 4 carbon straight or branched chain hydroxyalkyl, wherein at least one of $R_x$ and $R_y$ is said hydroxyalkyl.

2. A compound according to claim 1 which in free base form is 5,8-dichloro-4-hydroxy-1-[[2-[(2-hydroxyethyl)aminoethyl]amino]]-9,10-anthracenedione.

3. A pharmaceutical composition comprising a compound having the structural formula I according to claim 1 in combination with a pharmaceutically acceptable carrier.

4. A method for treating microbial infection in a mammal which comprises administering a sufficient amount of a compound having the structural formula I according to claim 1, in combination with a pharmaceutically acceptable carrier, to a mammal in need thereof.

* * * * *